(12) United States Patent
Nishi et al.

(10) Patent No.: US 10,987,632 B2
(45) Date of Patent: Apr. 27, 2021

(54) SPIRAL MEMBRANE ELEMENT

(71) Applicant: Nitto Denko Corporation, Ibaraki (JP)

(72) Inventors: Mieko Nishi, Ibaraki (JP); Yasuhiro Uda, Ibaraki (JP)

(73) Assignee: Nitto Denko Corporation

( * ) Notice: Subject to any disclaimer, the term of this patent is extended or adjusted under 35 U.S.C. 154(b) by 212 days.

(21) Appl. No.: 16/333,386

(22) PCT Filed: Sep. 15, 2017

(86) PCT No.: PCT/JP2017/033489
§ 371 (c)(1),
(2) Date: Mar. 14, 2019

(87) PCT Pub. No.: WO2018/052122
PCT Pub. Date: Mar. 22, 2018

(65) Prior Publication Data
US 2019/0247794 A1 Aug. 15, 2019

(30) Foreign Application Priority Data

Sep. 16, 2016 (JP) .............................. JP2016-181478

(51) Int. Cl.
*B01D 63/10* (2006.01)
*B01D 63/00* (2006.01)
(Continued)

(52) U.S. Cl.
CPC ............. *B01D 63/10* (2013.01); *B01D 63/00* (2013.01); *B01D 69/10* (2013.01); *B01D 69/12* (2013.01);
(Continued)

(58) Field of Classification Search
CPC .... B01D 63/10; B01D 63/00; B01D 2325/02; B01D 2325/04; B01D 2325/06;
(Continued)

(56) References Cited

U.S. PATENT DOCUMENTS 6,277,282 B1 8/2001 Kihara et al.
6,881,336 B2 4/2005 Johnson
(Continued)

FOREIGN PATENT DOCUMENTS

EP 2786798 10/2014
JP 2-218421 A 8/1990
(Continued)

OTHER PUBLICATIONS

Extended European Search Report, dated Apr. 17, 2020, in corresponding EP Patent Application No. 17851022.8.
(Continued)

*Primary Examiner* — Waqaas Ali
(74) *Attorney, Agent, or Firm* — Knobbe Martens Olson & Bear, LLP (57) ABSTRACT

A spiral membrane element is provided which has a restricted outer diameter but is heightened in effective membrane area, and further which can be decreased in operation energy therefor. The spiral membrane element is an element including plural membrane leaves L in each of which a permeation-side flow-channel member 3 is interposed between opposed separation membranes 1; a supply-side flow-channel member 2 interposed between any two of the membrane leaves L; a perforated central pipe 5 on which the membrane leaves L and the supply-side flow-channel member 2 are wound; and sealing parts that prevent a supply-side flow-channel from being mixed with a permeation-side flow-channel. The sealing parts include both-end sealing parts 11 in which an adhesive is used to seal two-side end parts of each of the membrane leaves L on both sides of the leaf in an axial direction A1 of the leaf. The thickness T1 of the both-end sealing parts 11 is 390 to 540 µm.

4 Claims, 4 Drawing Sheets

(51) Int. Cl.
  *D04B 21/00* (2006.01)
  *B01D 69/12* (2006.01)
  *B01D 69/10* (2006.01)
  *C08J 5/22* (2006.01)
  *D04B 21/06* (2006.01)

(52) U.S. Cl.
  CPC .............. *C08J 5/22* (2013.01); *D04B 21/00* (2013.01); *D04B 21/06* (2013.01); *B01D 2313/04* (2013.01); *B01D 2313/143* (2013.01); *B01D 2313/146* (2013.01); *B01D 2325/02* (2013.01); *B01D 2325/04* (2013.01); *B01D 2325/06* (2013.01)

(58) Field of Classification Search
  CPC .......... B01D 2313/04; B01D 2313/143; B01D 2313/146; B01D 2313/14; B01D 63/103; B01D 69/10; B01D 69/12; D04B 21/00; D04B 21/06; C08J 5/22
  See application file for complete search history.

(56) References Cited

U.S. PATENT DOCUMENTS

| | | |
|---|---|---|
| 9,675,937 B2 | 6/2017 | Dontula et al. |
| 2004/0099598 A1 | 5/2004 | Cheng |
| 2012/0219756 A1 † | 8/2012 | Yoshida |
| 2013/0098831 A1 | 4/2013 | Shrikhande et al. |
| 2013/0146531 A1 | 6/2013 | Tayalia et al. |
| 2014/0014569 A1 † | 1/2014 | Hirozawa |
| 2015/0182917 A1 | 7/2015 | Hosoya et al. |
| 2015/0376034 A1 | 12/2015 | Hayakawa et al. |
| 2016/0107126 A1 | 4/2016 | Cates |
| 2017/0232389 A1 | 8/2017 | Hayakawa et al. |
| 2017/0304775 A1 | 10/2017 | Yamaguchi et al. |
| 2019/0001274 A1 | 1/2019 | Nishi et al. |

FOREIGN PATENT DOCUMENTS

| | | |
|---|---|---|
| JP | H04-022424 | 1/1992 |
| JP | 9-276671 A | 10/1997 |
| JP | H11-235520 | 8/1999 |
| JP | 2000-51668 A | 2/2000 |
| JP | 2000-237554 | 9/2000 |
| JP | 2000-288542 | 10/2000 |
| JP | 2000288542 A2 † | 10/2000 |
| JP | 2001-252539 | 9/2001 |
| JP | 2001-300271 | 10/2001 |
| JP | 2003-275545 | 9/2003 |
| JP | 2004-202442 | 7/2004 |
| JP | 2005-199141 | 7/2005 |
| JP | 2006-507117 A | 3/2006 |
| JP | 2006-247629 A | 9/2006 |
| JP | 2006247629 A * | 9/2006 |
| JP | 2012-076042 | 4/2012 |
| JP | 2013-158713 A | 8/2013 |
| JP | 2015-15045 A | 1/2015 |
| JP | 2015-205269 | 11/2015 |
| JP | 2016-64363 A | 4/2016 |
| JP | 2016-144795 | 8/2016 |
| WO | WO2004/047965 | 6/2004 |
| WO | WO2012/133153 A1 | 10/2012 |
| WO | 14208602 A1 † | 12/2014 |
| WO | WO2014/208602 A1 | 12/2014 |
| WO | WO 2016/027302 | 2/2016 |
| WO | WO2017/115653 A1 | 7/2017 |

OTHER PUBLICATIONS

International Preliminary Report on Patentability, dated Mar. 28, 2019, in International Patent Application No. PCT/JP2017/033489.
International Search Report, dated Nov. 7, 2017, in corresponding International Patent Application No. PCT/JP2017/033489.
Hickey P J et al. "The economic optimization of spiral wound membrane . . . ", Journal of Membrane Science, 97, pp. 53-70.
Schwinge J et al. "Spiral wound modules and spacers: Review and analysis" Journal of Membrane Science, 242(1-2), pp. 129-153.
Extended European Search Report, dated Apr. 7, 2020, in corresponding European patent application No. 17851020.2.
Office Action, dated Jan. 14, 2021, issued in corresponding EP Patent Application No. 17851020.2.

\* cited by examiner
† cited by third party

SPIRAL MEMBRANE ELEMENT

TECHNICAL FIELD

The present invention relates to a spiral membrane element (also abbreviated to a membrane element hereinafter) for separating a component which floats in a liquid or is dissolved therein, and is useful as a technique for decreasing operation energy for a membrane element having a normalized and restricted outer diameter.

BACKGROUND ART

In recent years, in metropolises at seashore regions in dry and semidry districts where water resources are not easily ensured, trials have been made for desalting seawater to be desalinated. Furthermore, in countries where water resources are poor, trials have been made for purifying industrial wastewater and domestic wastewater to be reused. In recent years, attempts have been further made for removing oils and salts from oil-mixed wastewater high in turbidity, which is discharged from oil land plants or the like, and then reusing the resultant water.

As such a membrane element used for water treatment, known is a spiral membrane element as illustrated in FIGS. 1(a) to (b), which has plural membrane leaves L in each of which a permeation-side flow-channel member 3 is interposed between separation membranes 1 opposed to each other; a supply-side flow-channel member 2 interposed between any two of the membrane leaves L; a perforated central pipe 5 on which the membrane leaves L and the supply-side flow-channel member 2 are wound; and sealing parts 11 and 12 for preventing the mixing of supply-side flow-channels and permeation-side flow-channels.

In such a membrane element, it is important from the viewpoint of driving costs, the energy efficiency thereof, and others to improve this element in water permeability. It is effective therefor to heighten its separation membranes in effective membrane area. However, the outer diameter of a spiral membrane element is normalized, so that a restriction corresponding to the normalization is imposed onto the outer diameter. It is therefore necessary to heighten the effective membrane area while the outer diameter of the membrane element is maintained.

As a technique for heightening the effective membrane area of a membrane element, for example, Patent Document 1 discloses a method of making its permeation-side flow-channel members thin to heighten its separation membranes in packing density to make the effective membrane area high. However, according to this method, a permeation water channel present between any opposed two of the separation membranes becomes narrow, so that the pressure loss of the membrane element is made larger. Thus, it is not expected that this element is improved in water permeability in proportion to the membrane area.

Moreover, Patent Document 2 discloses a method of making a paint width of an adhesive large only onto sealing parts of membrane leaves where a central pipe is bonded to the membrane leaves, and further making the paint width of other sealing parts thereof relatively small to heighten the whole of the membrane element in effective membrane area.

PRIOR ART DOCUMENTS

Patent Documents

Patent Document 1: JP-A-H02-218421
Patent Document 2: JP-A-2015-150545

SUMMARY OF THE INVENTION

Problems to be Solved by the Invention

However, hitherto, contrivances have been made for making the width of sealing parts of such membrane leaves as small as possible. In a process for producing a membrane element, it is not expected that this element is dramatically improved in effective membrane area by the method of changing the paint width of the sealing parts partially, as disclosed in Patent Document 2.

In the meantime, as a method for heightening a membrane element in effective membrane area, effective is also a method of making the thickness of its separation membranes themselves small. However, when the thickness of, for example, composite semipermeable membranes is small, nonwoven fabrics which are supports therefor need to be heightened in density to cause the semipermeable membranes to have strength. Moreover, when a membrane element is produced, permeation-side flow-channel members high in density need to be used to cause the composite semipermeable membranes not to cave in.

Investigations by the inventors have made the following evident: when such a high-density material is used, the supports for the separation membranes or the permeation-side flow-channel members are not easily impregnated with an adhesive, so that sealing parts of the membrane leaves are easily increased in thickness; thus, even when made small in thickness, the composite semipermeable membrane are not sufficiently increased in effective membrane area by the thickness of the sealing parts.

However, also when the supply-side flow-channel members are thin, the separation membranes packed into a membrane element can be made large in effective membrane area. However, when the supply-side flow-channel members are thin, a pressure loss of the membrane element from its inlet to its outlet is increased to increase this element in operation energy therefor. Consequently, a problem is caused that driving costs increase.

As described above, about membrane elements having a restricted outer diameter, conventional techniques cause a problem that when the thickness of their flow-channel members is made small to increase the effective membrane area, the operation energy is increased by, for example, the increase in the pressure loss. Such an antinomic problem needs to be simultaneously solved.

Thus, an object of the present invention is to provide a spiral membrane element which has a restricted outer diameter but is heightened in effective membrane area therein, and further which can also be decreased in operation energy therefor.

Means for Solving the Problems

This object can be attained by the present invention as described in the present invention:

The spiral membrane element of the present invention includes a plurality of membrane leaves in each of which a permeation-side flow-channel member is interposed between opposed separation membranes; a supply-side flow-channel member interposed between any two of the membrane leaves; a perforated central pipe on which the membrane leaves and the supply-side flow-channel member are wound; and sealing parts that prevent a supply-side flow-channel from being mixed with a permeation-side flow-channel; wherein the sealing parts include both-end sealing parts in which an adhesive is used to seal two-side end parts of each of the membrane leaves on both sides of the leaf in an axial direction of the leaf; and the both-end sealing parts have a thickness of 390 to 540 μm.

The both-end sealing parts are parts giving the largest effect, when the separation membranes are packed into this element, onto the packing density of the separation membranes; according to the present invention, the thickness of these parts is set into the range of 390 to 540 μm, which is smaller than such conventional values, to make it possible that the membrane element, which has a restricted outer diameter, is heightened in effective membrane area. Moreover, by making the thickness of the both-end sealing parts smaller than the conventional values, the present membrane element can use thicker supply-side flow-channel members when equal in effective membrane area to conventional membrane elements. By making the membrane element smaller in pressure loss between the inlet and outlet of this element, operation energy therefor can also be decreased.

In the above-mentioned membrane element, the separation membranes are each preferably a composite semipermeable membrane having a separating functional layer on the outer surface of a porous support, and having a thickness of 80 to 100 μm. About such a thin composite semipermeable membrane, a nonwoven fabric which is a support therefor needs to be heightened in density in order to cause the membrane to have strength, and further when the membrane element is produced therefrom, the permeation-side flow-channel members that are high in density need to be used to cause the composite semipermeable membrane not to cave in. When such a high-density material is used, the supports for the separation membranes or the permeation-side flow-channel members are not easily impregnated with an adhesive, so that sealing parts of the membrane leaves are easily increased in thickness. Thus, as attained in the spiral membrane element of the present invention, it is particularly effective for heightening the effective membrane area to set the thickness of each of the both-end sealing parts into the range of 390 to 540 μm.

From this matter, it is preferred in the present invention that in the composite semipermeable membrane, the separating functional layer is located on an outer surface of one of the membrane leaves, and the porous support has a nonwoven fabric layer having a density of 0.85 to 1.0 g/cm$^3$ and a polymer porous layer on one surface of this nonwoven fabric layer.

The permeation-side flow-channel member is preferably a tricot knit having a density of 0.4 to 0.8 g/cm$^3$. In particular, it is more preferred that the permeation-side flow-channel member is made of a tricot knit having a plurality of ribs each made to include loops repeated linearly in a longitudinal direction, and a plurality of grooves present between these ribs, and the permeation-side flow-channel member has a membrane support index of 60 or more, this index being calculated in accordance with the following expression: the number (wale) of the grooves per 25-mm×{the rib width (mm)/the groove width (mm)}. When thinner separation membranes are used as described above, the use of such a permeation-side flow-channel member makes it possible to keep the rejection rate of the membrane element higher, and further restrain a lowering in the amount of permeation water by the blockage of the permeation-side flow-channel on the basis of a deformation of the separation membranes. Accordingly, the membrane element can be further decreased in operation energy therefor.

The thickness of each of the supply-side flow-channel members is preferably from 0.4 to 1.2 mm. This manner makes it possible to make good a balance between the effective membrane area and the pressure loss of the membrane element to decrease operation energy for the membrane element.

BRIEF DESCRIPTION OF THE DRAWINGS

FIG. 1 are each a view illustrating an example of the spiral membrane element of the present invention; and (a) is an element-partially-dismantled perspective view of the example, and (b) is a perspective view illustrating ends of one of its membrane leaves.

FIG. 2 are views illustrating an example of a process of producing the spiral membrane element of the present invention; and (a) is a plan view of one out of its separation membrane units, (b) is a front view of the separation membrane unit, and (c) is a front view illustrating a state of the separation membrane units before these units are laminated and wound.

FIG. 4 are each a view illustrating an example of a permeation-side flow-channel member in the spiral membrane element of the present invention; and (a) is a bottom view thereof, and (b) is a front view thereof that schematically illustrates a relationship between loops and oblique threads.

FIG. 5 are each a bottom view illustrating a different example of the permeation-side flow-channel member in the spiral membrane element of the present invention; and (a) illustrates an example of a denbigh knitted fabric (close loop), and (b) illustrates an example of a denbigh knitted fabric (open loop).

MODE FOR CARRYING OUT THE INVENTION (Spiral Membrane Element)

As illustrated in FIGS. 1(a) to (b), a spiral membrane element of the present invention has plural membrane leaves L in each of which a permeation-side flow-channel member 3 is interposed between separation membranes 1 opposed to each other; a supply-side flow-channel member 2 interposed between any two of the membrane leaves L; a perforated central pipe 5 on which the membrane leaves L and the supply-side flow-channel members 2 are wound; and sealing parts for preventing the mixing of supply-side flow-channels with permeation-side flow-channels. In the present embodiment, an example is illustrated in which the sealing parts include both-end sealing parts 11 and a peripheral-side sealing part 12.

The both-end sealing parts 11, out of the sealing parts, are parts yielded by using an adhesive to seal ends of two sides of each of the membrane leaves L on both sides of the leaf in an axial direction A1 thereof. The peripheral-side sealing part 12 is a part yielded by using an adhesive to seal an end of the membrane leaf L at the peripheral side tip of this leaf.

Figure 3:
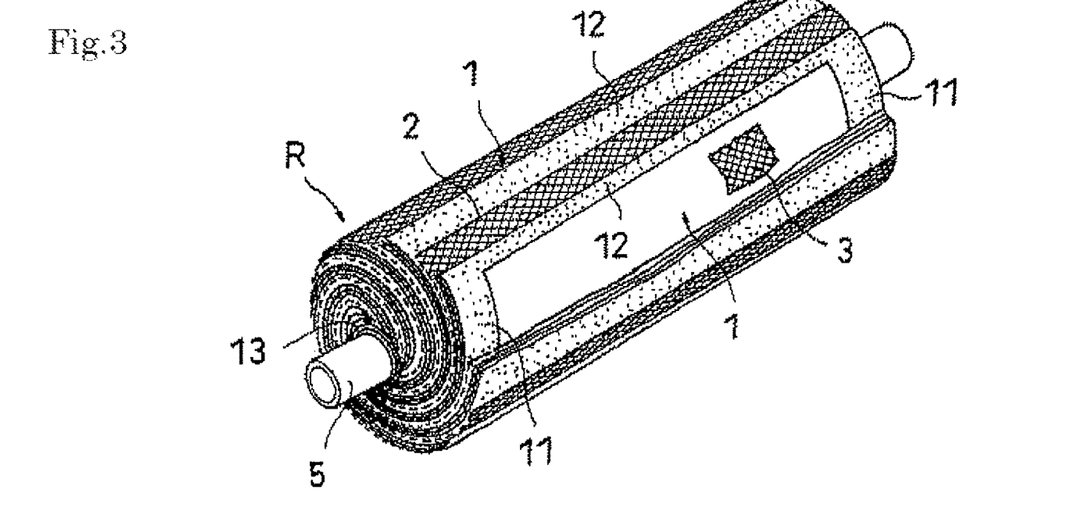
FIG. 3 is a roll-partially-cut-out perspective view illustrating an example of a roll in which membrane leaves and supply-side flow-channel members are wound on a central pipe.

As illustrated in FIG. 3, in the present invention, it is preferred that the membrane element has a central-side sealing part 13 yielded by using an adhesive to seal the perforated central pipe 5 and a base end of each of the membrane leaves L. The membrane element of the present embodiment has a roll R in which the membrane leaves L and the supply-side flow-channel members 2 are wound on the central pipe 5 to interpose these central-side sealing parts 13 therebetween.

The roll R can be produced through steps illustrated in, for example, FIGS. 2(a) to (c). FIG. 2(a) is a plan view of separation membrane units U, FIG. 2(b) is a front view of the separation membrane units U, and FIG. 2(c) is a front view illustrating a state of the separation membrane units U before these units are laminated onto each other to be wound. FIG. 3 is a roll-partially-cut-out perspective view illustrating an example of the roll R in which the membrane leaves L and the supply-side flow-channel members 2 are wound on the central pipe 5.

As illustrated in FIGS. 2(a) and (b), initially, the separation membrane units U are prepared in each of which: one of the supply-side flow-channel members 2 that is located between two-folded portions of each of the separation membranes 1 is stacked on one of the permeation-side flow-channel members 3; and adhesives 4 and 6 for forming the both-end sealing parts 11 and the peripheral-side sealing part 12 are painted, respectively, onto both-end portions of the permeation-side flow-channel member 3 in the axial direction A1, and onto the tip portion of the wound members. At this time, a protective tape may be bonded to the fold of the separation membrane 1.

The adhesives 4 and 6 are not particularly limited, and may be each an adhesive known in the prior art. Specific examples thereof include urethane adhesives, epoxy adhesives, and hot-melt adhesives. Thus, the adhesives may each be any adhesive known in the prior art.

Next, as illustrated in FIG. 2(c), the separation membrane units U, the number of which is equal to the number of the membrane leaves L, are laminated onto a permeation-side flow-channel member 3 having an extended portion longer than the corresponding portions of other permeation-side flow-channel members, out of the entire permeation-side flow-channel members. In this way, a laminate of the separation membrane units U is prepared. At this time, the central-side sealing part 13 can be formed by painting an adhesive also onto both-end portions of the extended portion of the lowermost permeation-side flow-channel member 3 in the axial direction A1.

Next, as illustrated in FIG. 2(c), the perforated central pipe 5 is rotated in a direction of an arrow to wind the separation membrane units U onto the central pipe 5. At this time, opposed two of the separation membranes 1 are bonded to one of the permeation-side flow-channel members 3 with the adhesive 4 and 6 to form any one of the membrane leaves L that has the both-end sealing parts 11 and the peripheral-side sealing part 12.

Figure 1:
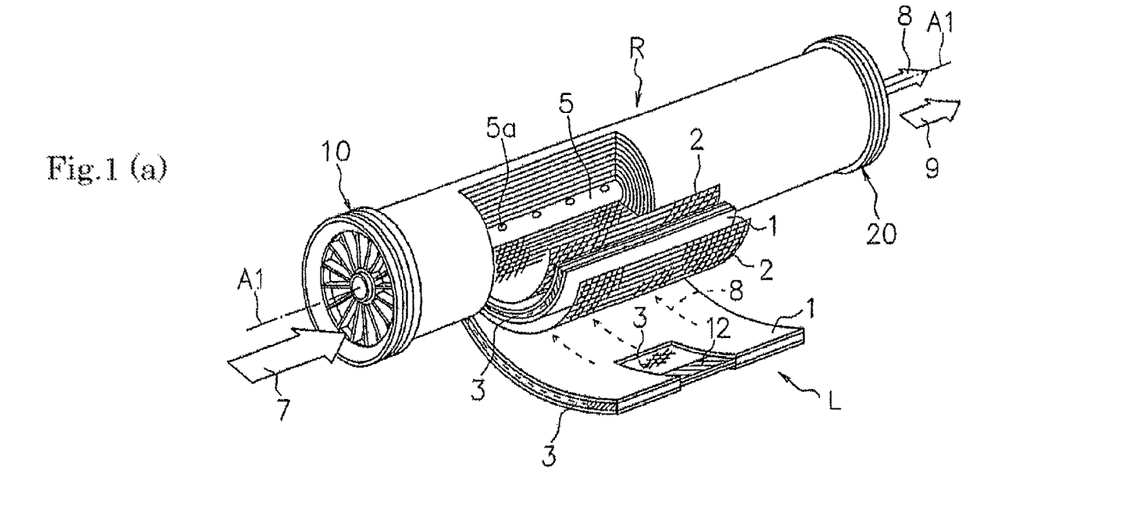

As a result, as illustrated in FIG. 3, the roll R is formed, in which the membrane leaves L and the supply-side flow-channel members 2 are wound on the central pipe 5. After the sealing, the roll R may be subjected to, for example, trimming of both end portions thereof in order to adjust the length of the roll in the axial direction A1. As illustrated in FIG. 1, an upstream-side end member 10, such as a seal carrier, is fitted to an upstream side of this roll R, and a downstream-side end member 20, such as a telescoping member, is optionally fitted to a downstream side of the roll. Moreover, for example, a sealing material, a reinforcing member, and an exterior may be optionally set up to the membrane element.

In the spiral membrane element of the present invention, the sealing parts of each of the membrane leaves L has the both-end sealing parts 11, and the thickness T1 of the both-end sealing parts 11 is from 390 to 540 µm, preferably from 400 to 510 µm, more preferably from 430 to 490 µm.

When the spiral membrane element has the peripheral-side sealing parts 12, the thickness T2 of the peripheral-side sealing parts 12 of the membrane leaves L is preferably from 390 to 540 µm, more preferably from 400 to 510 µm, even more preferably from 430 to 490 µm. The thickness T1 of the both-end sealing parts 11 and the thickness T2 of the peripheral-side sealing parts 12 may be the same as or different from each other.

The thickness T1 of the both-end sealing parts 11 and the thickness T2 of the peripheral-side sealing parts 12 are adjustable in accordance with the paint amount and the viscosity of the adhesives, the temperature, and others (of course, the thicknesses are adjustable in accordance with the thickness of each of the members concerned). It is however preferred to adjust the thicknesses in accordance with the winding pressure when the roll R is formed. The winding pressure is adjustable by, for example, the nip pressure of a nip roll pressured into a direction toward the central pipe 5 when the separation membrane units U are wound onto the central pipe 5. In this case, at the time when the central pipe 5 is rotated to pass the separation membrane units U between the central pipe 5 and the nip roll, the adhesive 4 interposed between the separation membranes 1 is pressurized. The pressurizing makes a change of the both-end sealing parts 11 in thickness T1. In the same manner, the adhesive 6 interposed between the separation membranes 1 is pressurized. The pressurizing makes a change of the peripheral-side sealing parts 12 in thickness T2.

In other words, by heightening the winding pressure when the roll R is formed, the thickness T1 can be made smaller than such conventional values thereof. This method is effective, particularly, when a thin composite semipermeable membrane is used. Specifically, about a thin composite semipermeable membrane, a nonwoven fabric which is a support therefor needs to be heightened in density, and further when a membrane element is produced therefrom, the permeation-side flow-channel members 3 that are high in density need to be used to cause the composite semipermeable membrane not to cave in when a membrane element is produced. When such a material high in density is used, the support of the separation membranes 1 and the permeation-side flow-channel members 3 are not easily impregnated with any adhesive, so that the thickness T1 of the sealing parts 11 of the membrane leaves L easily becomes large. Thus, effective is the adjustment of the thickness T1 into a predetermined range by heightening the winding pressure.

However, when the winding pressure is heightened, it is preferred to adjust the resin amount into an optimal amount matched with the heightened pressure. This is because the width of the resin may be broadened too largely when the winding pressure is heightened. Moreover, when the winding pressure is made too high, the central pipe may be broken, and the resin may be broadened too largely so that the resin portion may be lowered in density to be deteriorated in sealing performance.

In the present invention, in order to heighten the effective membrane area in the membrane element, which has a restricted outer diameter, it is favorable that the thickness T1 is made smaller than such conventional values by such a method, and further a thin composite semipermeable membrane is used.

Specifically, it is preferred in the present invention to use, as each of the separation membranes 1, a composite semipermeable membrane having a separating functional layer on a surface of a porous support, and having a thickness of 80 to 100 µm. Such a composite semipermeable membrane is preferably a membrane in which: a separating functional layer is located onto the outside surface of each of the membrane leaves L; and a porous support is a support having a polymer porous layer on a single surface of a nonwoven fabric layer having a density of 0.85 to 1.0 g/cm$^3$. Furthermore, when such a thin composite semipermeable membrane is used, it is particularly preferred to use, for the permeation-side flow-channel members 3, a tricot knit having a density of 0.4 to 0.8 g/cm$^3$.

In an ordinary spiral membrane element, membrane leaves L are wound in number of 15 to 30; however, the membrane leaves L can be wound in number of about 20 to 35 when the thickness of their composite semipermeable membranes is smaller than such conventional values. This manner makes it possible to heighten the composite semipermeable membranes in effective membrane area, so that the membrane element can treat a large volume of liquid to be remarkably raised in treatment efficiency.

When the membrane element is used, a supply liquid 7 is supplied to this element from one of both ends of the membrane element as illustrated in FIG. 1. The supplied supply liquid 7 flows along the supply-side flow-channel members 2 into a direction parallel with the axial direction A1 of the central pipe 5, and then is discharged as a concentrated liquid 9 from the other-end side of the membrane element. Moreover, in the step in which the supply liquid 7 flows along the supply-side flow-channel members 2, a permeation liquid 8 which has passed through the separation membranes 1 flows along the permeation-side flow-channel members 3 as represented by broken line arrows in the figure from openings 5a into the central pipe 5, and is then discharged from one of the ends of the central pipe 5.

The supply-side flow-channel members 2 generally have a function of keeping spaces surely, these spaces being for supplying a fluid thoroughly and uniformly onto the membrane plane. The supply-side flow-channel members 2 may be, for example, nets; knitted fabrics, or knits; or sheets worked to have irregularities. Such a matter that has a maximum thickness of about 0.1 to 3 mm is appropriately usable as the need arises. The supply-side flow-channel members 2 are preferably members low in pressure loss, and are more preferably members that further cause an appropriate turbulence effect. Moreover, any two of flow-channel members are set, respectively, onto both surfaces of each of the separation membranes. In general, different flow-channel members are used; and a half thereof is used, at the supply liquid side of the membrane element, as the supply-side flow-channel members 2, and the other half is used, at the permeation liquid side thereof, as the permeation-side flow-channel members 3. As the supply-side flow-channel members 2, flow-channel members which are each in a thick network form having large meshes are used while as the permeation-side flow channel members 3, flow-channel members of a woven fabric or knit having fine meshes are used.

When an RO membrane or NF membrane is used for the purpose of, for example, seawater desalination or waste water treatment, the supply-side flow-channel members 2 are laid on respective inner surface sides of the composite semipermeable membranes each folded into two. The structure of the supply-side flow-channel members 2 is preferably a network structure in which linear products are generally arranged into the form of lattices.

The material that forms the supply-side flow-channel members is not particularly limited, and may be, for example, polyethylene or polypropylene. The resin may contain a fungicide or antibacterial agent. The thickness of each of the supply-side flow-channel members 2 is generally from 0.2 to 2.0 mm, preferably from 0.5 to 1.0 mm. If the thickness is too large, reductions are made in quantity of the membrane leaves which can be held in the membrane element, and in permeation amount of liquid. Reversely, if the thickness is too small, pollutants adhere easily to the member leaves to deteriorate the membrane element easily in permeation performance.

In particular, in the present invention, the combination with the supply-side flow-channel members 2 of 0.9 to 1.3 mm causes pollutants not to be easily deposed, and further causes bio fouling not to be easily generated. Thus, when the membrane element is continuously used, a lowering of liquid in flux can be restrained.

Moreover, the combination with the supply-side flow-channel members 2 having a thickness from 0.4 to 1.2 mm, preferably from 0.6 to 0.9 mm makes good a balance between the effective membrane area and the pressure loss of the membrane element to decrease the membrane element further in operation energy.

The central pipe 5 is sufficient to be a pipe having a circumference in which openings 5a are made, and may be any one of such conventional pipes. When the spiral membrane element is used in, for example, seawater desalination or waste water treatment, permeation water that has passed through the separation membranes 1 generally invades the inside of the central pipe 5 through the openings in the wall face of the pipe to form permeation-side flow-channels. The length of the central pipe 5 is generally larger than the length of the membrane element in the axial direction thereof. However, the central pipe 5 may be a central pipe divided into plural pieces to have a linked structure. The material constituting the central pipe 5 is not particularly limited, and may be a thermosetting resin or thermoplastic resin.

Hereinafter, a detailed description will be made about the composite semipermeable membranes and the permeation-side flow-channel members 3 which are preferably used in the present invention.

(Permeation-Side Flow-Channel Members)

When an RO membrane or NF membrane is used for the purpose of, for example, seawater desalination or waste water treatment, each of the permeation-side flow-channel members is located as illustrated in FIG. 1 to be interposed between any opposed two of the separation membranes 1 in the membrane leaves L. The permeation-side flow-channel member is required to support the separation membranes from the back sides of the membranes against pressure applied to the membrane, and further to ensure flow-channels for permeation liquid.

In order for the permeation-side flow-channel member to ensure such a function in the present invention, the permeation-side flow-channel member is preferably made of a tricot knit, preferably a tricot knit subjected to resin-reinforcing or melting treatment after the formation of the knit.

Figure 4:
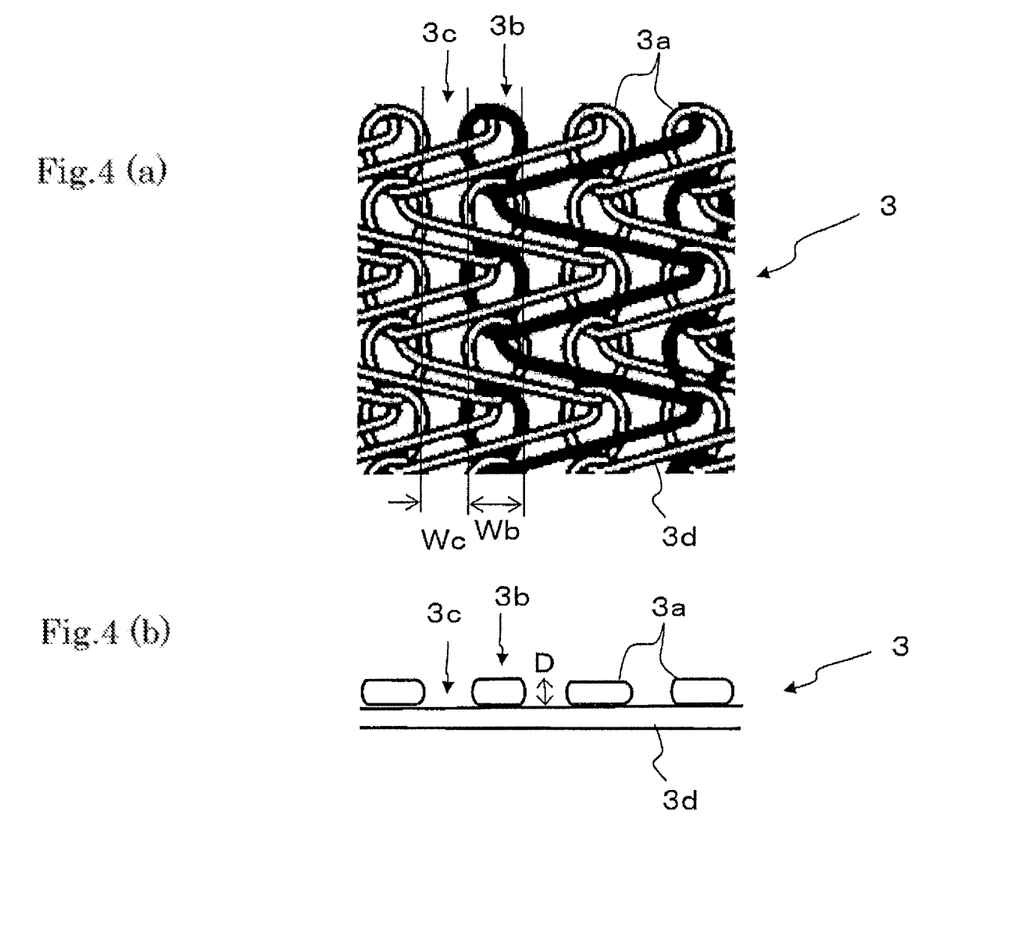

Examples of the tricot knit include single denbigh knit, double denbigh knit, single atlas knit, single cord knit, and double cord knit (referred to also merely as cord knit). In the present invention, preferred is a tricot knit as illustrated in each of FIGS. 4(a) to (b), which is classified into cord knits or denbigh knits. In FIG. 4(a), a single warp thread is represented in black to make the knitted shape of the warp thread easily understandable. FIG. 4(b) schematically shows a relationship between loops 3a and oblique threads 3d.

These tricot knits each have, as in the cord knits shown in FIGS. 4(a) to (b), plural ribs 3b made of loops 3a repeated linearly into a longitudinal direction, and plural grooves 3c present between the ribs 3b. The grooves 3c each have, in the bottom thereof, one of the oblique threads 3d for linking one of the loops 3a with the next loop 3a to extend a warp thread.

In other words, the single warp thread is constituted by parts of the loops 3a and parts of the oblique thread 3d.

Figure 5:
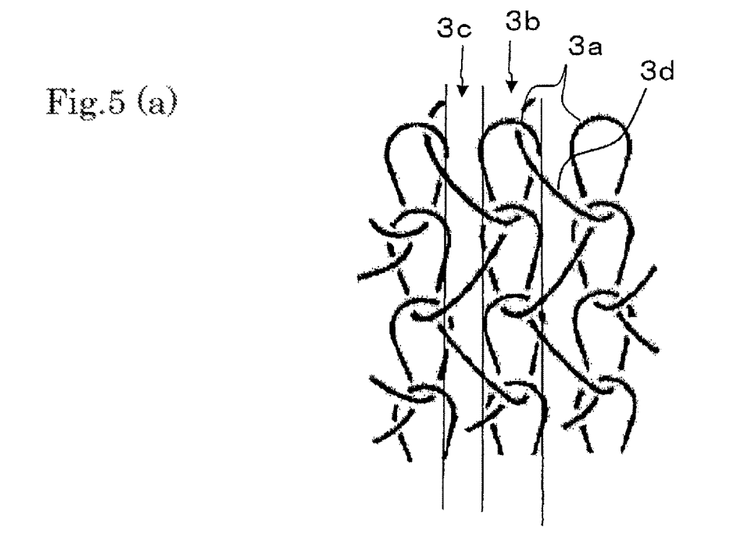

FIG. 5 each show a different example of each of the permeation-side flow-channel members, and FIGS. 5(a) and (b) show an example of a denbigh knit (close lap), and an example of a denbigh knit (open lap), respectively. Each of these examples also has plural ribs 3b each made of loops 3a repeated linearly in a longitudinal direction, and plural grooves 3c present between these ribs 3b. The grooves 3c each have, in the bottom thereof, one of the oblique threads 3d for linking one of the loops 3a with the next loop 3a to extend a warp thread. In other words, the single warp thread is constituted by parts of the loops 3a and parts of the oblique thread 3d.

About each of the permeation-side flow-channel members 3 in the present invention, the membrane support index calculated in accordance with the following is preferably 60 or more, more preferably from 60 to 135, even more preferably from 70 to 120: the groove number (wale) per 25-mm×{the rib width Wb (mm)/the groove width Wc (mm)}

The groove width Wc in a tricot knit denotes the average value of the largest interval portion between adjacent ones of the loops 3a and the smallest interval portion between the same. In working examples, a measurement is made about the average value of the largest interval portion between adjacent two of the loops 3a and the smallest interval portion between the same from an optical microscopic photograph thereof. The same is measured about 10 loop pairs. The average value of the resultant values is then represented. When the tricot knit is reinforced with a resin, individual dimensions thereof are defined as dimensions represented from a shape of the loops 3a which is constituted by adding the thickness of the resin present on each of the loops 3a to the loop original shape (the same is applied to individual dimensions that will be described hereinafter).

The rib width Wb denotes the average value of the largest interval portion of any one of the loops 3a and the smallest interval portion thereof. In the working examples, a measurement is made about the average value of the largest interval portion of one of the loops 3a and the smallest interval portion thereof from an optical microscopic photograph thereof. The same is measured about 10 loop pairs. The average value of the resultant values is then represented.

About the permeation-side flow-channel members 3 in the present invention, the flow-channel index calculated in accordance with the following is characterized by being from 0.18 to 0.45 (mm²), preferably from 0.20 to 0.40 (mm²), more preferably from 0.22 to 0.35 (mm²): {the groove width Wc (mm)×the groove depth D (mm)×the groove number (wale) per 25-mm}/the number (course) of the loops 3a that form the ribs 3b per 25-mm.

The groove depth D in the tricot knit denotes the height from the front surface of the oblique thread 3d present between adjacent two of the loops 3a to the highest portion of the loops 3a. In each of the working examples, from an optical microscopic photograph thereof, a measurement is made about the height from the front surface of the oblique thread 3d present to the highest portion of the loops 3a. The same is measured about 10 loop pairs. The average value of the resultant values is then represented.

The groove number (wale) per 25-mm is preferably from 40 to 60, and the rib width Wb is preferably from 0.2 to 0.4 mm.

In the tricot knit, the groove depth D is preferably from 0.10 to 0.15 mm, and the number (course) of the loops 3a that form the ribs 3b per 25-mm is preferably from 40 to 55.

These dimensions, and the membrane support index and the flow-channel index are adjustable in accordance with, for example, the knitting manner when the tricot knit is produced, the setting of the wale and the course, the thread diameter, and tension applied at the time of the knitting.

For the constituent threads of the permeation-side flow-channel members, the following examples are given: polyesters such as polyethylene terephthalate, and polyethylene naphthalate; and polyolefins such as polyethylene and polypropylene. Out of these resins, polyethylene terephthalate is particularly preferred from the viewpoint of workability and productivity.

When a knit is formed and subsequently reinforced with a resin, a method therefor is, for example, a method of impregnating the inside of its fiber with the resin to cure the resin, or a method of coating the surface of its fiber with the resin to cure the resin. Examples of the resin used for the reinforcement include melamine resin, and epoxy resin.

The constituent threads of the permeation-side flow-channel members may each be a monofilament or a multifilament. However, constituent threads each having a constant thickness constitute the tricot knit. Out of such tricot knits, preferred is a cord knit having an evident, or defined structure in which grooves are continuous in a linear form.

The thickness of each of the permeation-side flow-channel members is preferably from 0.10 to 0.40 mm, more preferably from 0.15 to 0.35 mm, even more preferably from 0.20 to 0.30 mm. If the thickness is less than 0.10 mm, sufficient flow-channels are not easily ensured to cause a problem that the pressure loss of the permeation liquid is increased. If the thickness is more than 0.40 mm, the composite semipermeable membranes in the membrane element become small in effective area to cause a problem that the flow rate of the permeation liquid is lowered. The constituent threads of the permeation-side flow-channel member are preferably from 0.1 to 0.15 mm for the formation of the tricot knit having the above-mentioned thickness.

In the present invention, in the invention, the groove width Wc in the tricot knit is preferably from 0.05 to 0.40 mm, more preferably from 0.10 to 0.28 mm. If the groove width is less than 0.05 mm, the pressure loss of the permeation liquid tends to become too large. If the groove width is more than 0.40 mm, a lowering in the rejection rate may be easily caused by the deformation of the composite semipermeable membrane.

The width of any groove continued in a linear form in a tricot knit denotes the average value of the width of the largest interval portion and that of the smallest portion out of portions between adjacent two of loops of the knit. From a microscopic photograph of the knit, the above-defined average value is measured about each of 10 out of its loop pairs. The resultant 10 average values are further averaged. In this way, the width of the continued groove can be represented.

In the membrane element, a direction in which the permeation-side flow-channel members are arranged may be any direction. Preferably, the permeation-side flow-channel members are wound to set the direction of the linearly continued grooves along a circumferential direction of the membrane element.

(Composite Semipermeable Membranes)

The composite semipermeable membranes in the present invention are each a membrane having a separating functional membrane on a surface of a porous support. The porous support is preferably a support having a polymer porous layer on a single surface of a nonwoven fabric layer.

The thickness of the composite semipermeable membrane is from about 80 to 105 µm, preferably from 85 to 100 µm.

Such a composite semipermeable membrane is called a RO (reverse osmosis) membrane, an NF (nano-filtration) membrane or an FO (forward osmosis) membrane depending on the filtration properties or treatment methods, and is usable for the production of super pure water, seawater desalination, desalinization of sprinkling water, reuse of wastewater, or others.

The separating functional layer is, for example, a polyamide-based, cellulose-based, polyether-based or silicon-based separating functional layer. The separating functional layer is preferably a product having a polyamide-based separating functional layer. The polyamide-based separating functional layer is generally a homogenous membrane having no perceptible pores and having a desired ion separating power. This separating functional layer is not particularly limited as far as this layer is a polyamide-based thin membrane which is not easily peeled from the polymer porous layer. For example, the following is well known: a polyamide-based separating functional layer yielded by polymerizing a polyfunctional amine component and a polyfunctional acid halide component interfacially on a porous support membrane.

It is known that such a polyamide-based separating functional layer has pleated fine structures. The thickness of this layer is not particularly limited, and is from about 0.05 to 2 µm, preferably from 0.1 to 1 µm. It is known that if this layer is too thin, defects in the membrane plane comes to be easily generated, and if the layer is too thick, the separating functional layer is deteriorated in permeation performance.

The method for forming the polyamide-based separating functional layer onto the outer surface of the polymer porous layer is not particularly limited, and may be any known method. Examples thereof include interfacial polymerization, phase separation, and thin-membrane applying methods. In the present invention, the interfacial polymerization method is preferably used. The interfacial polymerization method is, for example, a method of coating the upper of the polymer porous layer with an aqueous solution of a polyfunctional-amine-component-containing amine, and then bringing a solution of a polyfunctional-acid-halide-component-containing organic solution into contact with the surface of the layer which is coated with this aqueous amine solution to cause interfacial polymerization to form a skin layer. After the application of the aqueous amine solution and that of the organic solution, this method is preferably advanced while an excess portion of the solutions is removed. In this case, the removing method is preferably, for example, a method of inclining the target membrane to cause the excess portion to flow, a method of spraying gas thereto to blow the excess portion off, or a method of bringing a blade made of, for example, rubber into contact therewith to scrape off the excess portion.

In this step, the period until the aqueous amine solution contacts the organic solution is varied in accordance with the composition and the viscosity of the aqueous amine solution, and the diameter of pores in surfaces of the porous support membrane, and is from about 1 to 120 seconds, preferably from about 2 to 40 seconds. If this interval period is too long, the aqueous amine solution penetrates and diffuses into the depth of the inside of the porous support membrane, so that unreacted fractions of the polyfunctional amine component remain in a large volume in the porous support membrane. Thus, inconveniences may be caused. When the interval between the applications of these solutions is too short, an excess of the aqueous amine solution remains too much so that the membrane tends to be lowered in performance.

After the contact of the aqueous amine solution with the organic solution, the present contact system is preferably heated and dried at a temperature of 70° C. or higher to form the skin layer. In this way, the membrane can be heightened in mechanical strength, heat resistance and others. The heating temperature is more preferably from 70 to 200° C., in particular preferably from 80 to 130° C. The heating temperature is preferably from about 30 seconds to 10 minutes, more preferably from about 40 seconds to 7 minutes.

The polyfunctional amine component contained in the aqueous amine solution is a polyfunctional amine having two or more reactive amine groups. Examples thereof include aromatic, aliphatic and alicyclic polyfunctional amines. Examples of the aromatic polyfunctional amines include m-phenylenediamine, p-phenylenediamine, o-phenylenediamine, 1,3,5-triaminobenzene, 1,2,4-triaminobenzene, 3,5-diaminobenzoic acid, 2,4-diaminotoluene, 2,6-diaminotoluene, N,N'-dimethyl-m-phenylenediamine, 2,4-diaminoanisole, amidol, and xylylenediamine. Examples of the aliphatic polyfunctional amines include ethylenediamine, propylenediamine, tris(2-aminoethyl)amine, and n-phenyl-ethylenediamine. Examples of the alicyclic polyfunctional amines include 1,3-diaminocyclohexane, 1,2-diaminocyclohexane, 1,4-diaminocyclohexane, piperazine, 2,5-dimethylpiperazine, and 4-aminomethylpiperazine. These polyfunctional amines may be used singly or in any combination of two or more thereof. In particular, when a high rejection rate, out of reverse osmosis membrane performances, is required, it is preferred in the present invention to use, as a main component, m-phenylenediamine, which gives a separating functional layer high in denseness. When a high flux keeping ratio is required out of NF membrane performances, it is preferred to use, as a main component, piperazine.

The polyfunctional acid halide component contained in the organic solution is a polyfunctional acid halide having two or more reactive carbonyl groups. Examples thereof include aromatic, aliphatic, and alicyclic polyfunctional acid halides. Examples of the aromatic polyfunctional acid halides include trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, and chlorosulfonylbenzene dicarboxylic acid dichloride. Examples of the aliphatic polyfunctional acid halides include propanedicarboxylic acid dichloride, butanedicarboxylic acid dichloride, pentanedicarboxylic acid dichloride, propanetricarboxylic acid trichloride, butanetricarboxylic acid trichloride, pentanetricarboxylic acid trichloride, glutaryl halides, and adipoyl halides. Examples of the alicyclic polyfunctional acid halides include cyclopropanetricarboxylic acid trichloride, cyclobutanetetracarboxylic acid tetrachloride, cyclopentanetricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, and tetrahydrofurandicarboxylic acid dichloride. These polyfunctional acid halides may be used singly or in any combination of two or more thereof. In order to yield a skin layer high in salt-stopping performance, it is preferred to use an aromatic polyfunctional acid halide. It is also preferred to use, as at least one component of the polyfunctional acid halide components, a polyfunctional acid halide having tri or higher polyfunctionalities to form a crosslinked structure.

In the interfacial polymerization method, the concentration of the polyfunctional amine component in the aqueous amine solution is not particularly limited, and is preferably from 0.1 to 7% by weight, more preferably from 1 to 5% by weight. If the concentration of the polyfunctional amine component is too low, defects are easily generated in the skin layer so that the composite semipermeable membrane tends to be lowered in salt blocking performance. In the meantime, if the concentration of the polyfunctional amine component is too high, the skin layer becomes too thick so that the permeation flux of the liquid tends to be lowered.

The concentration of the polyfunctional acid halide component in the organic solvent is not particularly limited, and is preferably from 0.01 to 5% by weight, more preferably from 0.05 to 3% by weight. If the concentration of the polyfunctional acid halide component is too low, unreacted fractions of the polyfunctional amine component increase so that defects are easily generated in the skin layer. In the meantime, if the concentration of the polyfunctional acid halide component is too high, unreacted fractions of the polyfunctional acid halide component increase. Consequently, the skin layer becomes too thick so that the permeation flux of the liquid tends to be lowered.

The organic solvent into which the polyfunctional acid halide is incorporated is not particularly limited as far as the solvent is a solvent which is low in solubility in water and dissolves the polyfunctional acid halide component without deteriorating the porous support membrane. Examples thereof include cyclohexane, heptane, octane, nonane, and other saturated hydrocarbons; and 1,1,2-trichlorotrifluoroethane and other halogen-substituted hydrocarbons. The organic solvent is preferably a saturated hydrocarbon having a boiling point of 300° C. or lower, preferably 200° C. or lower.

An additive may be added to the aqueous amine solution or the organic solution to improve the resultant skin layer in various performances and handleability. Examples of the additive include polyvinyl alcohol, polyvinyl pyrrolidone, polyacrylic acid, and other polymers; sorbitol, glycerin, and other polyhydric alcohols; sodium dodecylbenzene sulfonate, sodium dodecylsulfate, sodium laurylsulfate, and other surfactants; sodium hydroxide, trisodium phosphate, triethylamine, and other basic compounds for removing halogenated hydrogen produced by polymerization; acylation catalysts; and compounds each described in JP-A-H08-224452, the solubility parameter of which is from 8 to 14 $(cal/cm^3)^{1/2}$.

A coating layer made of a polymeric component that may be of various types may be laid on a naked surface of the separating functional layer. This polymeric component is not particularly limited as far as the polymeric component is a polymer in which neither the separating functional layer nor the porous support membrane is dissolved, and is a polymer which does not elute out when the membrane element makes a water treatment operation. Examples thereof include polyvinyl alcohol, polyvinyl pyrrolidone, hydroxypropyl cellulose, polyethylene glycol, and saponified polyethylene-vinyl acetate copolymers. It is preferred to use, out of these examples, polyvinyl alcohol. It is particularly preferred to use a polyvinyl alcohol having a saponification degree of 99% or more, or to crosslink a polyvinyl alcohol having a saponification degree of 90% or more together with the polyamide-based resin of the skin layer to form a structure which does not elute out easily at the water treatment time.

By laying such a coating layer, the state of electric charges on the membrane surface is adjusted and further hydrophilicity is given to the surface. This matter allows to restrain pollutants from adhering on the surface. Furthermore, synergetic effects of this matter and the present invention heighten the flux-keeping effect further.

The nonwoven fabric layer used in the present invention is not particularly limited as far as the layer is a nonwoven fabric layer that keeps the separating performance and permeation performance of the composite semipermeable membranes while giving an appropriate mechanical strength thereto. Any commercially available nonwoven fabric is usable. The material of this nonwoven fabric may be a material made of, for example, polyolefin, polyester or cellulose. The material may be a mixture in which plural materials are mixed with each other. The use of polyester is particularly preferred from the viewpoint of the moldability thereof. It is allowable to use a long-fiber nonwoven fabric or a short-fiber nonwoven fabric. The use of the long-fiber nonwoven fabric is preferred from the viewpoint of fine fluffing, which causes pinhole defects, and the evenness of the membrane plane. At this time, the gas permeability of the nonwoven fabric layer alone may be from about 0.5 to 10 $cm^3/cm^2 \cdot s$, more preferably from about 1 to 5 $cm^3/cm^2 \cdot s$ although the gas permeability is not limited into such a range.

The thickness of the nonwoven fabric layer is preferably 90 µm or less, more preferably 80 µm or less, in particular preferably 70 µm or less. If this thickness is too large, the composite semipermeable membrane becomes too high in permeation resistance so that the flux of the liquid is easily lowered. Reversely, if the thickness is too small, the nonwoven fabric layer is lowered in mechanical strength as a composite semipermeable membrane support, so that a stable composite semipermeable membrane is not easily gained. Thus, the thickness is preferably 50 µm or more, more preferably 55 µm or more.

The above-mentioned polymer porous layer is not particularly limited as far as this layer is a polymer porous layer that can form the above-mentioned polyamide-based separating function layer. The polymer porous layer is usually a finely porous layer having a pore diameter of about 0.01 to 0.4 µm. A material for forming the finely porous layer may be a material that may be of various types, examples thereof including polysulfones, polyarylethersulfones such as polyethersulfone, polyimides, and polyfluorovinylidenes. It is preferred to form a polymer porous layer using a polysulfone or polyarylethersulfone since the layer is chemically, mechanically and thermally stable.

In the present invention, the thickness of the polymer porous layer is set preferably to 35 µm or less, more preferably to 32 µm or less. It has been understood that if this layer is too thick, the composite semipermeable membrane is easily lowered in flux-keeping ratio after the membrane element is pressurized. Furthermore, the thickness is in particular preferably 29 µm or less, most preferably 26 µm or less. By forming the layer thinly to this degree, the stability of the flux keeping ratio can be made higher. If this layer is too thin, defects are easily generated therein. Thus, the thickness is preferably 10 µm or more, more preferably 15 µm or more.

An example of a method will be demonstrated by which when the polymer of the polymer porous layer is polysulfone, the layer is produced. The polymer porous layer can be produced by a method generally called a wet method and a dry and wet method. The polymer porous layer can be formed on a nonwoven fabric through a solution preparing step of dissolving a polysulfone and various additives initially into a solvent, a coating step of coating the upper of the nonwoven fabric with the solution, a drying step of vaporizing the solvent in this solution to generate micro phase separation, and a fixing step of immersing the resultant into a solidifying bath such as a water bath to fix the dry matter. The thickness of the polymer porous layer can be set by adjusting the concentration in the above-mentioned solution and coating quantity under a calculation of the proportion of the polymer with which the nonwoven fabric is impregnated.

(Usage of Spiral Membrane Element)

The spiral membrane element of the present invention is usable for seawater desalination, wastewater treatment and others. In recent years, in order to decrease the power consumption of the machine concerned when the machine is driven, composite semipermeable membranes have been developed which can gain a sufficient permeation flux even at a pressure lower than in the prior art. In an article using such a composite semipermeable membrane, the differential pressure (driving pressure) between the supply side pressure and the permeation side pressure of the membrane is set into a range, for example, from 0.3 to 3.0 MPa, preferably from 0.5 to 1.5 MPa. Also when the article is driven at such a low pressure, permeation-side flow-channel members higher in density than in the prior art are used in the spiral membrane element of the present invention. In this way, the spiral membrane element is made capable of coping with the matter that its porous supports are made thinner.

Other Embodiments of Spiral Membrane Element

The above description has been made about the best embodiment of the present invention. However, the present invention is not limited to this embodiment. The embodiment can be variously changed within a scope that is substantially the same as recited in the claims of the present invention.

Figure 2:
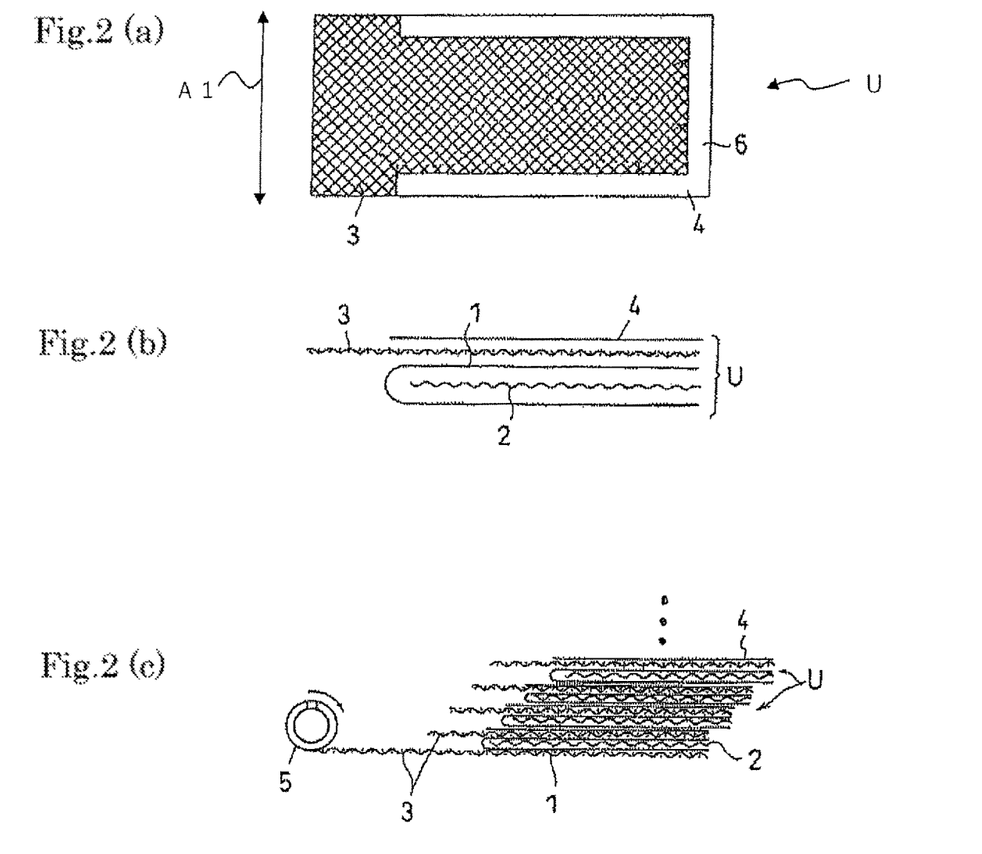

Specifically, in the above-mentioned embodiment, an example as illustrated in FIG. 2 has been described in which any two of the permeation-side flow-channel members 3 are put onto one of the separation membranes 1 that is folded into two so as to sandwich one of the supply-side flow-channel members 2, and further the adhesives 4 and 6 are painted thereonto. In the present invention, however, any two of the separation membranes 1 each folded into two may be put onto each of the permeation-side flow-channel members 3 and further the adhesives 4 and 6 are painted thereonto. It is also allowable that instead of each of the separation membranes 1 each folded into two, two separation membranes 1 are used to sandwich each of the supply-side flow-channel members 2, and a sealing part is also located to the winding-start side of the sandwich. Furthermore, it is allowable to use a continuous separation membrane 1 not to require any peripheral-side sealing part 12.

EXAMPLES

Hereinafter, the present invention will be described in detail by way of working examples thereof, and comparative examples. However, the invention is not limited to these working examples. In each of the working examples, and others, physical properties and others are evaluated as described below.

(Thickness Measurement)

The thickness of each of their members was measured, using a commercially available thickness gauge (DIAL THICKNESS GAUGE G-7C, manufactured by Ozaki Mfg. Co., Ltd.). About measurements of the thickness of a nonwoven fabric layer and that of a polymer porous layer, the thickness of the nonwoven fabric layer was beforehand measured. In the state that the polymer porous layer was formed on the nonwoven fabric layer, the thickness of the whole of the composite semipermeable membrane support was measured. Thereafter, the difference in thickness between the composite semipermeable membrane support and the nonwoven fabric was represented, and the difference was used as the thickness of the polymer porous layer. In the measurement of the thickness of each membrane plane, the average value of arbitrarily-selected ten points in the same membrane plane was used.

(Permeation Water and Rejection Rate)

Using a 0.15% salt water as a supply liquid, performance evaluations were made about the water permeation amount and the rejection rate of any one of the membrane elements under the following conditions: a water temperature of 25° C., a pressure of 1.05 MPa, and a concentrated liquid flow rate of 150 L/min.

(Membrane Support Index of Permeation-Side Flow-Channel Members)

In an optical microscopic photograph of a flat surface and a cross section of any one of the permeation-side flow-channel members, the groove width, the rib width, and the groove depth thereof were each measured at each of arbitrarily-selected ten points therein, using a scale as a reference. The average value of the measured values was used. About the wale of the permeation-side flow-channel member, a measurement was made through an optical microscope about the number (wale) of grooves in an area 25 mm×25 mm of the member. On the basis of this value, the membrane support index was calculated and calculated in accordance with the expression: the number (wale) of the grooves per 25-mm×{the rib width (mm)/the groove width (mm)}.

(Pressures at Supply-Side and Concentrated-Side of Membrane Element, Difference Between the Pressures, and Pump Operation Energy)

Using a software IMSDesign-2016 supplied on the web from a company Hydranautics, properties of any one of the membrane elements in each of the examples were put in under set common conditions described below to calculate the respective pressures [bar] at the supply-side and at the concentrated-side of the element, the difference [bar] between these pressures, and the pump operation energy [kWh/m$^3$].

Specifically, two 7-membrane-element-put vessels were arranged at a front stage of a system, and one 7-membrane-element-put vessel was arranged at a rear side thereof. Into the vessels, 21 of the membrane elements in each of the examples were charged, these membrane elements being produced by using membranes giving a pure water permeation amount of 1.4 m$^3$/m$^2$d when a water pressure of 1.05 MPa was applied to the vessels. The present system was driven for a supply water having an electric conductivity of 775 μS/cm, a total impurity solubility of 409 mg/L, a pH of 6.3, and a water temperature of 30° C. under conditions of a collection ratio of 75% and a total permeation water amount of 15 m$^3$/hr. At this time, the operating pressure, and the pump operation energy per unit freshwater generation amount were calculated out.

Example 1

While a commercially available nonwoven fabric (width: about 1 m; density: 0.8 g/cm$^3$) made of a polyester for water-treatment-membrane support and having a thickness of 100 μm was transported, a mixed solution of polysulfone and dimethylformamide (polymer concentration: 18.35% by weight) was continuously applied onto a surface of the fabric. The resultant was subjected to solidifying treatment in water of 35° C. temperature to produce a long porous support (thickness: 130 μm) in which a polymer porous layer of 30 μm thickness was formed.

While this porous support was transported, a solution A was brought into contact with the polymer porous layer outer-surface, this solution being a solution in which 3% by weight of m-phenylenediamine was mixed with 0.15% by weight of sodium laurylsulfate. An excess of the solution A was then removed to form a coating layer of the solution A. Next, a solution B was brought into contact with the solution-A coating layer outer-surface, the solution B being a solution in which 0.3% by weight of trimesic acid chloride was incorporated in a solvent of hexane. Thereafter, the resultant was dried in an environment of 120° C. temperature to form a separating functional layer. In this way, each long composite semipermeable membrane (thickness: 130 μm) was produced.

Spiral membrane elements each having an outer diameter of 200 mm were each produced by using the resultant composite semipermeable membranes, permeation-side flow-channel members (tricot knits made of a polyethylene terephthalate) each having a thickness, a density and a membrane support index shown in Table 1, and supply-side flow-channel members (nets made of a polyethylene) each having a thickness shown in Table 1, painting an adhesive (a urethane resin manufactured by Sanyu Rec. Ltd.) thereon to give sealing parts having a width of 10 to 30 mm, and then winging membrane leaves (the total number of the membrane leaves: 23) onto a central pipe (outer diameter: 39 mm) at a winding pressure shown in Table 1. Thereafter, as performances of any one of the membrane elements, the water permeation amount and the rejection rate thereof were evaluated. The membrane element was dismantled, and then evaluations were made about the thickness of the both-end sealing parts of each of the membrane leaves, and the membrane area of the membrane leaf. Moreover, the following were represented: the respective pressures at the supply-side and at the concentrated-side of the element, the difference between these pressures, and the pump operation energy. The results are together shown in Table 1.

Examples 2 to 4

In each of the examples, while a commercially available nonwoven fabric (width: about 1 m; density: 0.9 g/cm$^3$) made of a polyester for water-treatment-membrane support and having a thickness of 65 μm was transported, a mixed solution of polysulfone and dimethylformamide (polymer concentration: 18.35% by weight) was continuously applied onto a surface of the fabric. The resultant was subjected to solidifying treatment in water of 35° C. temperature to produce a long porous support (thickness: 90 μm) in which a polymer porous layer of 25 μm thickness was formed.

Membrane elements were each produced in the same way as in Example 1 except that in Example 1, this porous support was used to produce each of the composite semipermeable membranes (thickness: 90 μm), and the membrane element was produced under conditions in Table 1. For reference, by changing the thickness of, for example, one or more of the constituent members and the sealing parts in such a way, the number of the membrane leaves can be increased or decreased even when the outer diameter of the membrane element is not varied. This increase or decrease also makes a change of the membrane element in effective membrane area (the same matter is applied to the working examples and others that will be described below). Thereafter, performances of any one of the membrane elements were evaluated. The membrane element was dismantled, and then evaluations were made about the thickness of the both-end sealing parts of each of the membrane leaves, and the membrane area of the membrane leaf. Moreover, the following were represented: the respective pressures at the supply-side and at the concentrated-side of the element, the difference between these pressures, and the pump operation energy. The results are together shown in Table 1.

Comparative Example 1

Product in Prior Art

Membrane elements were each produced in the same way as in Example 1 except that in Example 1, the membrane leaves were wound onto the central pipe under a winding pressure shown in Table 1. Thereafter, performances of any one of the membrane elements were evaluated. The membrane element was dismantled, and then evaluations were made about the thickness of the both-end sealing parts of each of the membrane leaves, and the membrane area of the membrane leaf. Moreover, the following were represented: the respective pressures at the supply-side and at the concentrated-side of the element, the difference between these pressures, and the pump operation energy. The results are together shown in Table 1.

Comparative Example 2

Product in Prior Art

Membrane elements were each produced in the same way as in Comparative Example 1 except that in Comparative Example 1, supply-side flow-channel members shown in Table 1 were used. Thereafter, performances of any one of the membrane elements were evaluated. The membrane element was dismantled, and then evaluations were made about the thickness of the both-end sealing parts of each of the membrane leaves, and the membrane area of the membrane leaf. Moreover, the following were represented: the respective pressures at the supply-side and at the concentrated-side of the element, the difference between these pressures, and the pump operation energy. The results are together shown in Table 1.

Comparative Example 3

Membrane elements were each produced in the same way as in Comparative Example 1 except that in Comparative Example 1, the same composite semipermeable membranes as in Example 2 were used, and the membrane leaves were wound onto the central pipe at a winding pressure shown in Table 1. Thereafter, performances of any one of the membrane elements were evaluated. The membrane element was dismantled, and then evaluations were made about the thickness of the both-end sealing parts of each of the membrane leaves, and the membrane area of the membrane leaf. Moreover, the following were represented: the respective pressures at the supply-side and at the concentrated-side of the element, the difference between these pressures, and the pump operation energy. The results are together shown in Table 1.

TABLE 1

|  | Comparative Example 1 (prior art product) | Comparative Example 2 (prior art product) | Comparative Example 3 | Example 1 (increase in winding pressure) | Example 2 (increase in winding pressure) | Example 3 (increase in winding pressure) | Example 4 (increase in winding pressure) |
|---|---|---|---|---|---|---|---|
| Membrane thickness [mm] | 0.13 | 0.13 | 0.09 | 0.13 | 0.09 | 0.09 | 0.09 |
| Nonwoven fabric density [g/cm³] | 0.8 | 0.8 | 0.9 | 0.8 | 0.9 | 0.9 | 0.9 |
| Thickness [mm] of permeation-side flow-channel member | 0.25 | 0.25 | 0.25 | 0.25 | 0.25 | 0.25 | 0.25 |
| Density [g/cm³] of permeation-side flow-channel member | 0.3 | 0.3 | 0.3 | 0.3 | 0.6 | 0.6 | 0.6 |
| Membrane support index of permeation-side flow-channel member | 26 | 26 | 26 | 26 | 107 | 107 | 107 |
| Thickness [mm] of supply-side flow-channel member | 0.86 (34 mil) | 0.66 (26 mil) | 0.86 (34 mil) | 0.86 (34 mil) | 0.86 (34 mil) | 0.66 (26 mil) | 0.86 (34 mil) |
| Winding pressure [kgf] | 4 | 4 | 8 | 15 | 8 | 8 | 15 |
| Membrane element performances — Water permeation amount | 11000 gpd | 12000 gpd | 11400 gpd | 11600 gpd | 12000 gpd | 14000 gpd | 12300 gpd |
| Membrane element performances — NaCl rejection rate | 99.60% | 99.60% | 98.00% | 99.60% | 99.60% | 99.60% | 99.60% |
| Thickness [mm] of both-end sealing parts of membrane leaf | 0.57 | 0.57 | 0.47 | 0.51 | 0.47 | 0.47 | 0.43 |
| Effective membrane area [ft²] | 400 | 440 | 440 | 420 | 440 | 510 | 450 |
| Supply-side and concentrated-side pressures [bar] | 4.3-2.9 | 4.8-1.8 | 5.0-3.5 | 4.1-2.8 | 4-2.7 | 4.2-1.7 | 3.9-2.7 |
| Difference [bar] between supply-side and concentrated-side pressures | 1.4 | 3.0 | 1.4 | 1.3 | 1.3 | 2.5 | 1.2 |
| Pump operation energy [kWh/m³] | 0.21 | 0.23 | 0.25 | 0.20 | 0.19 | 0.20 | 0.19 |

From a comparison of Comparative Example 1 and Example 1 in Table 1 with each other, it is understood that when spiral membrane elements are increased in winding pressure therein, the thickness of both-end sealing parts of each of their membrane leaves is decreased to increase these membrane elements in effective membrane area, so that the elements are increased in water permeation amount to be decreased in operation energy therefor.

From a comparison of Example 1 with Examples 2 to 4, it is understood that the use of thinner composite semipermeable membranes makes both-end sealing parts of membrane leaves smaller in thickness to increase membrane elements in effective membrane area, so that the elements are increased in water permeation amount to be decreased in operation energy therefor.

From a comparison of Examples 2 and 3 with each other, it is understood that the use of thinner supply-side flow-channel members also makes membrane elements large in effective membrane area to increase the elements in water permeation amount; however, operation energy therefor is unfavorably increased.

Furthermore, from a comparison of Comparative Example 3 with Example 2, it is understood that a spiral membrane element is lowered in rejection rate by the use of conventional permeation-side flow-channel members small in membrane support index (Comparative Example 3) notwithstanding the use of thinner composite semipermeable membranes, and further the former use makes the membrane element small in water permeation amount to increase this element in operation energy therefor; however, by the use of permeation-side flow-channel members large in membrane support index (Example 2), the spiral membrane element can be decreased in operation energy also.

DESCRIPTION OF REFERENCE SIGNS

1 Separation membrane
2 Supply-side flow-channel member
3 Permeation-side flow-channel member
3a Loop
3b Rib
3c Groove
4 Adhesive
5 Central pipe
6 Adhesive
11 Both-end sealing part
12 Peripheral-side sealing part
R Roll
T1 Both-end sealing part thickness
T2 Peripheral-side sealing part thickness
U Separation membrane unit
Wb Rib width
Wc Groove width
D Groove depth

The invention claimed is:

1. A spiral membrane element, comprising a plurality of membrane leaves in each of which a permeation-side flow-channel member is interposed between opposed separation membranes; a supply-side flow-channel member interposed between any two of the membrane leaves; a perforated central pipe on which the membrane leaves and the supply-side flow-channel member are wound; and sealing parts that prevent a supply-side flow-channel from being mixed with a permeation-side flow-channel;

wherein the sealing parts comprise both-end sealing parts in which an adhesive is used to seal two-side end parts of each of the membrane leaves on both sides of the leaf in an axial direction of the leaf, and the both-end sealing parts have a thickness of 390 to 540 m;

wherein the permeation-side flow-channel member is a tricot knit having a density of 0.4 to 0.8 g/cm³;

wherein the tricot knit comprises a plurality of ribs each made to comprise loops repeated linearly in a longitudinal direction, and a plurality of grooves present between these ribs, and the permeation-side flow-channel member has a membrane support index of 60 or more, the index being calculated in accordance with the following expression:

number(wale) of the grooves per 25-mm×{rib width (mm)/groove width(mm)}.

2. The spiral membrane element according to claim 1, wherein the separation membranes are each a composite semipermeable membrane having a porous support, and a separating functional layer on a surface of the porous support, and having a thickness of 80 to 100 μm.

3. The spiral membrane element according to claim 2, wherein in the composite semipermeable membrane, the separating functional layer is located on/over an outer surface of each of the membrane leaves, and the porous support has a nonwoven fabric layer having a density of 0.85 to 1.0 g/cm$^3$ and a polymer porous layer on/over one surface of the nonwoven fabric layer.

4. The spiral membrane element according to claim 1, wherein the supply-side flow-channel member has a thickness of 0.4 to 1.2 mm.

* * * * *